J. TALBOT.
CULTIVATOR.
APPLICATION FILED NOV. 23, 1921.
1,409,618.
Patented Mar. 14, 1922.
2 SHEETS—SHEET 1.
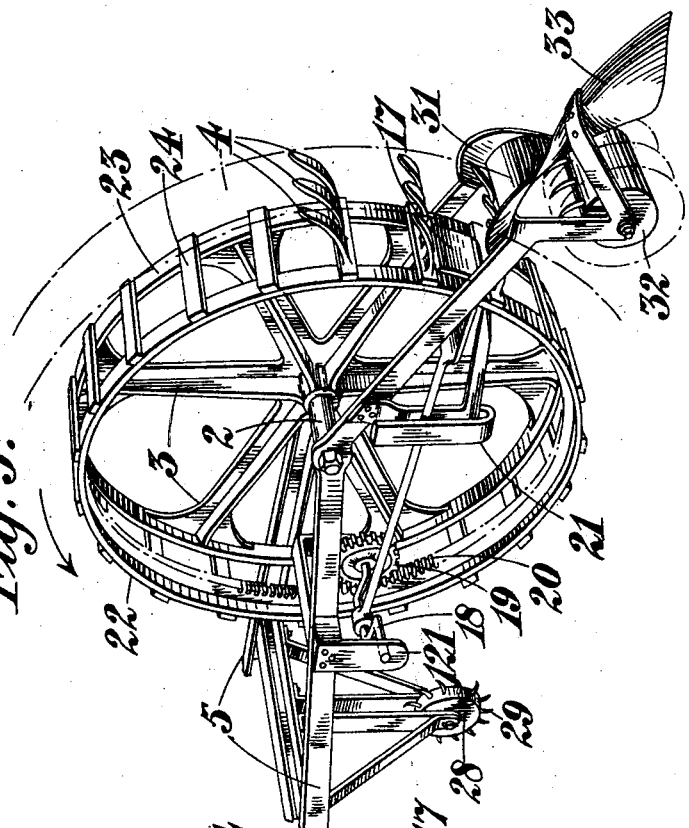
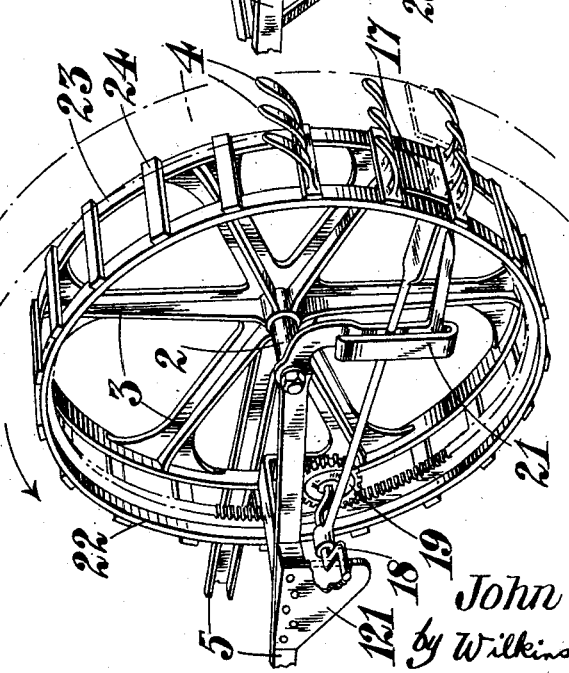
Inventor
John Talbot
by Wilkinson & Giuda
Attorneys

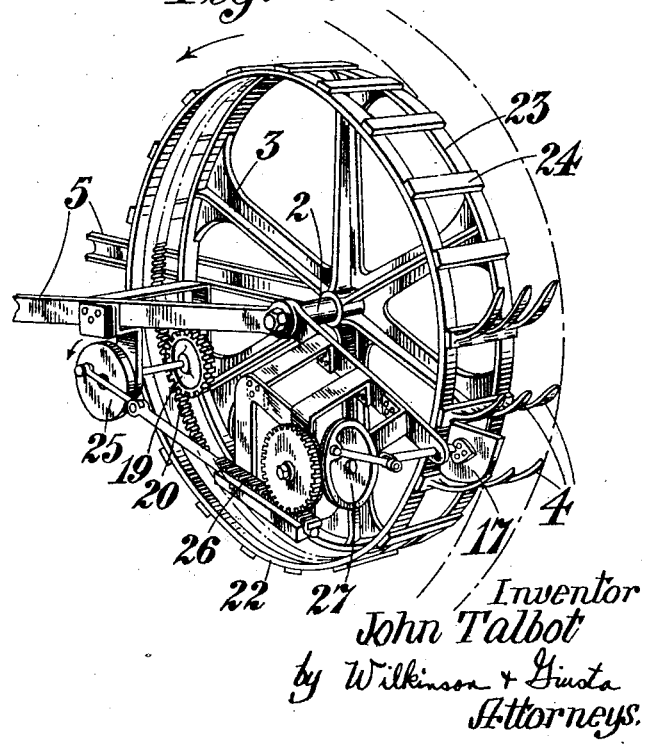

UNITED STATES PATENT OFFICE.

JOHN TALBOT, OF DULVERTON, ENGLAND.

CULTIVATOR.

1,409,618.  Specification of Letters Patent.  Patented Mar. 14, 1922.

Application filed November 23, 1921. Serial No. 517,253.

*To all whom it may concern:*

Be it known that I, JOHN TALBOT, a subject of the King of England, residing at Dulverton, Somerset, England, have invented certain new and useful Improvements in Cultivators, of which the following is a specification.

This invention is for improvements in or relating to "cultivators", the latter term being used in its broadest sense to include not only the "grabber" type of implement which penetrates the soil without inverting it, but also the plough and like tillage implements.

One object of this invention is to provide an implement which may be employed in place of an ordinary plough but which in performing the work of the latter will afford a comparative saving in the tractive or propulsive effort required for the operation. The improved implement may also be used as an auxiliary to the ordinary plough, that is to say, on ploughed land for the purpose of breaking up the surface soil.

A further object of the invention is the provision of a combination machine which will effect in succession the cutting of the surface soil, the inversion of the latter, and the loosening of the subsoil respectively.

A "cultivator" made and operating according to this invention comprises in combination a wheel member (or members) arranged to be drawn or propelled over the soil in rolling contact therewith, a series of digging elements (such as tines, forks, spades or the like) projecting from the periphery of said wheel member and adapted to be forced into the soil by virtue of the weight of the wheel member and its associated parts in conjunction with the leverage transmitted by the tractive or propulsive effort exerted on said member, with or without means positively to remove the uplifted soil from the digging elements as or after they leave the ground.

It will be seen that rotation is imported to the digger wheel by virtue of the frictional contact with the soil and that the weight of the implement itself in combination with the downward component of the forward tractive or propulsive thrust are utilized to force the diggers into the ground. In this respect the cultivator according to this invention differs from those hitherto known devices in which rotary wheels carrying tines are positively driven, for example by gearing from the transporting wheels of a vehicle which itself carries the weight of the digging wheel. It will be seen that one advantage accruing from the use of a comparatively weighty wheel acting directly on the soil is that the wheel functions to some extent as a roller.

Preferably the digging elements are forwardly inclined from the rim of the wheel member in the direction of rotation of the latter, and are of substantially cycloidal cuvature whereby their whole length follows in the track made by their points or edges as they enter the soil.

The digging elements may be arranged in any desired spaced relationship around the rim of the digging wheel. For example they may be disposed in circumferential rows spaced apart at intervals across the width of the wheel rim, or again they may be arranged in parallel rows extending across the width of the rim and spaced apart at approximately equal intervals around the circumference of the rim. Where the latter construction is employed the rows may either be parallel to the axis of rotation of the digging wheel or inclined obliquely thereto for example at an angle of 45°. As will be hereinafter explained, the arrangement of the digging elements in parallel rows obliquely inclined facilitates the removal of the uplifted soil from the digging wheel.

The implement may be provided with coulters in the form of knives or blades mounted either from the rim of the main digging wheel or upon the rim of a subsidiary wheel member supported from the implement frame in rolling contact with the soil in advance of the digging wheel.

According to one feature of this invention a combination machine is provided comprising a digging wheel mounted on a horizontal axle engaged by a draught or propelling frame, a bladed coulter wheel as above described in advance of the digging wheel, a sub-soiler wheel suspended from the implement frame in rolling contact with the furrow in rear of the digging wheel, and means to remove the uplifted soil from the latter and, if desired, to convey the soil thus removed to a position in the furrow in rear of the sub-soiler.

Various means may be adopted for removing the soil uprooted by the digging elements and thus preventing the clogging of the wheel—these means will be more particularly described hereinafter.

Some preferred forms of the invention will now be described with reference to the accompanying drawings, which are to be taken as purely diagrammatic illustrations in which—

Fig. 1 is a perspective view showing an improved cultivator constructed according to the present invention;

Fig. 2 is a similar view showing a slight modification; and,

Fig. 3 is also a perspective view showing the machine actually commercially used.

Like reference numerals denote like parts throughout the figures of the drawings.

In accordance with the invention, a wheel of comparatively great diameter is made to revolve about an axle 2 carried by the frame 5 of any suitable character. The wheel 3 is preferably of a skeleton construction with spokes radiating from the hub which extends about the axle and having circular ring members 22 and 23 connected by transverse bars 24 upon which are mounted rows of curved projections or tines 4 adapted to penetrate the soil on rotation of the wheel.

Figures 1 and 2 illustrate alternative means of removing the uplifted soil from the diggers and in both cases said means comprises a plunger device 17 automatically operable on rotation of the digging wheel to reciprocate from a position clear of the latter into and out of each successive space presented between adjacent rows of digging tines as the latter rotate. In Figure 1 the plunger device 17 comprises an L shaped member operable by means of a crank 18 driven by means of a pinion 19 gearing with an internal rack 20 on the main digging wheel. The crank and pinion are supported by a bracket 21 attached to the frame 5 of the implement. The reciprocating member 17 is guided in its motion by a U shaped bracket 21 depending from the wheel axle 2. It will be seen that where this method is employed, a digging wheel with a skeleton rim is necessary. In the construction illustrated the rim comprises two ring members 22 and 23 interconnected by cross-bars 24, the member 22 carrying the internal rack and the member 23 the spokes 3.

In the form shown in Figure 2 the plane of reciprocation is at right angles to the plane of rotation of the digging wheel. As before the wheel is provided with a skeleton rim an internal rack 20 and pinion 19 gearing therewith. In this case, however, the pinion 19 is arranged to transmit through an eccentric 25 a reciprocating motion to a rack 26. This rack in turn transmits through bevel gearing 27 a reciprocating motion to the plunger device 17. It will be seen from the drawings that this driving mechanism is conveniently supported by brackets depending from the frame 5 of the implement.

In the foregoing example the plunger device has been shown operating across the wheel rim in a direction parallel to the axle 2. If, however, the rows of digging tines were disposed obliquely across the wheel rim a corresponding modification would necessarily require to be made in the arrangement of the plunger device. In this connection it is to be pointed out that, so far as the removal of the soil is concerned, it is advantageous to arrange the tines in oblique rows, as the soil then lies in a decline and a comparatively small effort is required to dislodge it, in fact in some cases it may not be necessary to provide means for positively effecting the removal.

In Figure 3 a combination machine is shown comprising a main digging wheel constructed and arranged as in Figure 1 and in addition thereto a leading wheel 28 carrying blades 29 and supported from the frame 5 by a bracket 30 depending therefrom. The wheel 28 is in rolling contact with the soil in advance of the digging wheel and functions like the coulter of an ordinary plough. Rigidly attached to the main frame 5 is a trailing frame 31 which carries at its lower end a sub-soiler wheel 32 in rolling contact with the furrow in rear of the digging wheel. If desired a slotted mould-board similar to that illustrated in Figure 1 may be employed in connection with this sub-soiler. In order to remove the soil discharged from the digging tines by the plunger device 17 to a position in the furrow in rear of the sub-soiler 32 a mould-board 33 supported by the frame 31 is provided. In the example illustrated the mould-board 33 is so shaped that it inverts the soil as it is discharged into the furrow.

In the constructions illustrated, the digging tines may, if desired, be connected across their points by a transverse bar having a serrated cutting edge, and this construction is particularly advantageous when there are only two tines arranged across the width of the wheel rim. It will be understood, of course, that any desired number of tines may be arranged in each row and there may be any convenient number of rows. Several digging wheels may, if required, be arranged side by side on the same horizontal axle, each with its quota of diggers, and means to remove the uplifted soil therefrom, or a common means may be provided to remove the soil simultaneously from each wheel.

If desired the implement may be provided with guiding means, such as the usual land and furrow wheels, or a slotted bogey may be used for the same purpose, it being understood that such means do not function in the operation of the main digging wheel or prevent the whole weight or substantially the whole weight of the implement from acting directly between the digging wheel and the ground.

Further, in order that the implement, when not in operation may be conveniently transported to and from its work by road, or elsewhere, land wheels (not shown), adjustable as to height in order to raise the diggers clear of the ground would be provided, or if a slotted bogey were used, the digging wheel would be adjustable thereon.

What I claim as my invention and desire to secure by Letters Patent is:—

1. A cultivator including a wheel rolling upon the soil and having tines projecting therefrom, a plunger arranged to move past the tines as they are successively presented to said plunger whereby to remove the earth clinging thereto, and means actuated upon rotation of the wheel for reciprocating the plunger.

2. A cultivator comprising a wheel adapted to roll directly in contact with the soil and having numerous small curved tines projecting from the periphery thereof and adapted to penetrate the ground, a draft frame coupled to the wheel, an auxiliary frame suspended from the draft frame, a plunger movably supported by the supplementary frame and adapted to move past the tines as they are successively moved past the plunger, and means for reciprocating the plunger including a gear element carried by said wheel and a cooperating gear member meshing with the wheel gear and having intermediate coupling means connected to the plunger.

In testimony whereof I affix my signature.

JOHN TALBOT.